(12) United States Patent
Berthold et al.

(10) Patent No.: US 7,872,071 B2
(45) Date of Patent: Jan. 18, 2011

(54) POLYETHYLENE MOLDING COMPOSITION FOR COATING STEEL PIPES

(75) Inventors: Joachim Berthold, Kelkheim (DE); Ludwig Böhm, Hattersheim (DE); Heinz Vogt, Frankfurt (DE)

(73) Assignee: Basell Polyolefine GmbH, Wesseling (DE)

( * ) Notice: Subject to any disclaimer, the term of this patent is extended or adjusted under 35 U.S.C. 154(b) by 666 days.

(21) Appl. No.: 11/667,974

(22) PCT Filed: Nov. 17, 2005

(86) PCT No.: PCT/EP2005/012306

§ 371 (c)(1), (2), (4) Date: May 17, 2007

(87) PCT Pub. No.: WO2006/053741

PCT Pub. Date: May 26, 2006

(65) Prior Publication Data

US 2008/0090968 A1    Apr. 17, 2008

Related U.S. Application Data

(60) Provisional application No. 60/634,706, filed on Dec. 8, 2004.

(30) Foreign Application Priority Data

Nov. 18, 2004   (DE) .................. 10 2004 055 588

(51) Int. Cl.
C08F 297/08    (2006.01)
C08L 23/08    (2006.01)
C08L 23/06    (2006.01)

(52) U.S. Cl. .............. 525/53; 525/240; 525/242; 525/319; 525/321; 525/322; 525/324; 526/65

(58) Field of Classification Search ............... 525/53, 525/240, 242, 319, 321, 322, 324; 526/65
See application file for complete search history.

(56) References Cited

U.S. PATENT DOCUMENTS

| | | | |
|---|---|---|---|
| 4,336,352 A | 6/1982 | Sakurai et al. | |
| 4,447,587 A | 5/1984 | Berthold et al. | |
| 4,536,550 A | 8/1985 | Moriguchi et al. | |
| 4,975,485 A | 12/1990 | Sato et al. | |
| 5,338,589 A | 8/1994 | Bohm et al. | |
| 5,350,807 A | 9/1994 | Pettijohn et al. | |
| 5,422,400 A | 6/1995 | Kamiyama et al. | |
| 5,648,309 A | 7/1997 | Böhm | |
| 5,684,097 A | 11/1997 | Palmroos et al. | |
| 5,882,750 A | 3/1999 | Mink et al. | |
| 6,136,924 A | 10/2000 | Promel | |
| 6,180,721 B1 | 1/2001 | Rogestedt et al. | |
| 6,242,548 B1 | 6/2001 | Duchesne et al. | |
| 6,329,054 B1 | 12/2001 | Rogestedt et al. | |
| 6,344,522 B1 | 2/2002 | Promel | |
| 6,407,185 B1 | 6/2002 | Promel | |
| 6,713,561 B1 * | 3/2004 | Berthold et al. ............. | 525/191 |
| 2003/0149180 A1 | 8/2003 | Van Dun et al. | |
| 2006/0052542 A1 | 3/2006 | Berthold et al. | |
| 2006/0074193 A1 | 4/2006 | Berthold et al. | |
| 2006/0074194 A1 | 4/2006 | Berthold et al. | |
| 2006/0155058 A1 | 7/2006 | Berthold et al. | |

FOREIGN PATENT DOCUMENTS

| | | |
|---|---|---|
| DE | 199 45 980 | 3/2001 |
| DE | 102 59 491 | 7/2004 |
| EP | 0 129 312 | 12/1984 |
| EP | 0 068 257 | 4/1985 |
| EP | 0 401 776 | 12/1990 |
| EP | 0 492 656 | 7/1992 |
| EP | 0 532 551 | 3/1993 |
| EP | 0 603 935 | 6/1994 |
| EP | 0 797 599 | 10/1997 |
| EP | 0 905 151 | 3/1999 |
| EP | 1 266 738 | 3/2003 |
| GB | 2 056 996 | 3/1981 |
| JP | A-58-210947 | 8/1983 |
| WO | 91/18934 | 12/1991 |

(Continued)

OTHER PUBLICATIONS

M. Fleißner, "Slow Crack Growth and Creep Rupture Strength of Polyethylene Pipe," *Kunststoffe German Plastics*, vol. 77, pp. 45-50 (1987).

(Continued)

*Primary Examiner*—Roberto Rabago
(74) *Attorney, Agent, or Firm*—William R. Reid

(57) ABSTRACT

The invention relates to a polyethylene molding composition which has a multimodal molar mass distribution and is particularly suitable for producing protective coatings on steel pipes. The molding composition has a density at a temperature of 23° C. in the range from 0.94 to 0.95 g/cm³ and an $MFI_{190/5}$ in the range from 1.2 to 2.1 dg/min. It comprises from 45 to 55% by weight of a low molecular weight ethylene homopolymer A, from 30 to 40% by weight of a high molecular weight copolymer B of ethylene and another olefin having from 4 to 8 carbon atoms and from 10 to 20% by weight of an ultra high molecular weight ethylene copolymer C.

8 Claims, No Drawings

FOREIGN PATENT DOCUMENTS

| | | |
|---|---|---|
| WO | 97/03124 | 1/1997 |
| WO | 97/03139 | 1/1997 |
| WO | 01/23446 | 4/2001 |
| WO | WO 01/23446 | 4/2001 |
| WO | 2004/056921 | 7/2004 |
| WO | 2004/058876 | 7/2004 |
| WO | 2004/058877 | 7/2004 |
| WO | 2004/058878 | 7/2004 |
| WO | 2006/053740 | 5/2006 |
| WO | 2006/053741 | 5/2006 |

OTHER PUBLICATIONS

Flory, P.J. et al., "Crystalline Olefin Polymers Part II," High Polymers, John Wiley & Sons Inc., New York, vol. XX, (1964), pp. v, 418, 419, 602, 603.

"Auxiliaries for Crop Protection Formulations," Clariant Brochure, Product Range Crop Protection, Edition 2008.

* cited by examiner

POLYETHYLENE MOLDING COMPOSITION FOR COATING STEEL PIPES

This application is the U.S. national phase of International Application PCT/EP2005/012306, filed Nov. 17, 2005, claiming priority to German Patent Application 102004055588.5 filed Nov. 18, 2004, and the benefit under 35 U.S.C. 119(e) of U.S. Provisional Application No. 60/634,706, filed Dec. 8, 2004; the disclosures of International Application PCT/EP2005/012306, German Patent Application 102004055588.5 and U.S. Provisional Application No. 60/634,706, each as filed, are incorporated herein by reference.

The present invention relates to a polyethylene molding composition which has a multimodal molar mass distribution and is particularly suitable for producing protective coatings on pipes, and a process for preparing this molding composition in the presence of a catalytic system comprising a Ziegler catalyst and a cocatalyst via a multistage reaction sequence comprising successive polymerization steps.

Polyethylene is widely used for industrial applications in which a material having a high mechanical strength and a high resistance to thermooxidative degradation is required in order to ensure a long life even at elevated use temperatures. For this application, it is also advantageous for the polyethylene molding composition to have a low permeability to water vapor and oxygen because the steel pipe is then effectively protected against corrosion by moisture and contact with air. In addition, polyethylene has the particular advantages that it has good chemical resistance, it has a low intrinsic weight and it is a material which can easily be processed in the melt.

WO 97/03139 describes a coating composition based on polyethylene which has a bimodal molar mass distribution, are suitable for producing coatings on metal pipes and give the coated substrate improved durability in respect of corrosion, in respect of oxidative aging, in respect of weathering influences of all types and in respect of mechanical stresses.

Known polyethylene molding compositions having a unimodal molar mass distribution have disadvantages in terms of their processability, their environmental stress cracking resistance and their mechanical toughness. Compared to these, molding compositions having a bimodal molar mass distribution represent a technical improvement. They are easier to process and have (as indicated by the density) an improved stiffness/environmental stress cracking resistance ratio.

It was thus an object of the present invention to develop a polyethylene molding composition which retains good processability but displays significant advantages in respect of environmental stress cracking resistance and resistance to mechanical stresses, in particular at temperatures below 0° C.

This object is achieved by a molding composition of the generic type mentioned at the outset whose distinguishing features are that it comprises from 45 to 55% by weight of a low molecular weight ethylene homopolymer A, from 30 to 40% by weight of a high molecular weight copolymer B of ethylene and another olefin having from 4 to 8 carbon atoms and from 10 to 20% by weight of an ultra high molecular weight ethylene copolymer C, where all percentages are based on the total weight of the molding composition.

The invention further provides a process for preparing this molding composition in a cascaded suspension polymerization and a defect-free coating of steel pipes comprising this molding composition and having excellent mechanical strength properties combined with high stiffness.

The polyethylene molding composition of the invention has a density at a temperature of 23° C. in the range from 0.94 to 0.95 g/cm$^3$ and a broad trimodal molar mass distribution. The high molecular weight copolymer B contains a proportion of further olefin monomer units having from 4 to 8 carbon atoms, namely from 5 to 8% by weight. Examples of such comonomers are 1-butene, 1-pentene, 1-hexene, 1-octene and 4-methyl-1-pentene. The ultra high molecular weight ethylene copolymer C likewise contains one or more of the above-mentioned comonomers in an amount in the range from 7 to 11% by weight.

Furthermore, the molding composition of the invention has a melt flow index in accordance with ISO 1133, expressed as $MFI_{190/5}$, in the range from 1.2 to 2.1 dg/min and a viscosity number $VN_{overall}$, measured in accordance with ISO/R 1191 in decalin at a temperature of 135° C., in the range from 260 to 340 cm$^3$/g, in particular from 280 to 320 cm$^3$/g.

The trimodality as a measure of the position of the centers of gravity of the three individual molar mass distributions can be described with the aid of the viscosity numbers VN in accordance with ISO/R 1191 of the polymers formed in the successive polymerization stages. Here, the band widths of the polymers formed in the individual reaction stages are as follows:

The viscosity number $VN_1$ measured on the polymer after the first polymerization stage is identical to the viscosity number $VN_A$ of the low molecular weight polyethylene A and is, according to the invention, in the range from 70 to 90 cm$^3$/g.

The viscosity number $VN_2$ measured on the polymer after the second polymerization stage does not correspond to $VN_B$ of the relatively high molecular weight polyethylene B formed in the second polymerization stage, which can be determined only mathematically but is instead the viscosity number of the mixture of polymer A plus polymer B. According to the invention, $VN_2$ is in the range from 150 to 180 cm$^3$/g.

The viscosity number $VN_3$ measured on the polymer after the third polymerization stage does not correspond to $VN_C$ of the ultra high molecular weight copolymer C formed in the third polymerization stage, which can likewise be determined only mathematically, but is instead the viscosity number of the mixture of the polymer A, polymer B plus polymer C. According to the invention, $VN_3$ is in the range from 260 to 340 cm$^3$/g, in particular from 280 to 320 cm$^3$/g.

The polyethylene is obtained by polymerization of the monomers in suspension at temperatures in the range from 70 to 90° C., preferably from 80 to 90° C., a pressure in the range from 2 to 10 bar and in the presence of a highly active Ziegler catalyst composed of a transition metal compound and an organoaluminum compound. The polymerization is a three-stage polymerization, i.e. it is carried out in three successive stages, with the molar mass being regulated in each stage by means of added hydrogen.

Apart from the polyethylene, the polyethylene molding composition of the invention can further comprise additional additives. Such additives are, for example, heat stabilizers, antioxidants, UV absorbers, light stabilizers, metal deactivators, peroxide-decomposing compounds, basic costabilizers, in amounts of from 0 to 10% by weight, preferably from 0 to 5% by weight, and also fillers, reinforcing materials, plasticizers, lubricants, emulsifiers, pigments, optical brighteners, flame retardants, antistatics blowing agents, or combinations of these in total amounts of from 0 to 50% by weight, based on the total weight of the mixture.

The molding composition of the invention is particularly useful for producing coatings on metal pipes by extrusion by firstly plasticizing the polyethylene molding composition in an extruder at temperatures in the range from 200 to 250° C. and then extruding it through a suitable nozzle onto the pipe surface and cooling it there.

The molding composition of the invention can be processed particularly well by the extrusion process to produce coatings because it has a notched impact toughness (ISO) in the range from 8 to 14 kJ/m$^2$ and an environmental stress cracking resistance (ESCR) in the range >200 h.

The notched impact toughness$_{ISO}$ is measured at −30° C. in accordance with ISO 179-1/1eA/DIN 53453. The dimensions of the specimen are 10×4×80 mm, and it is provided with a V-notch having an angle of 45°, a depth of 2 mm and a radius at the bottom of the notch of 0.25 mm.

The environmental stress cracking resistance (ESCR) of the molding composition of the invention is determined by an internal measurement method and is reported in h. This laboratory method is described by M. Fleißner in Kunststoffe 77 (1987), p. 45 ff, and corresponds to ISO/CD 16770 which is now valid. The publication shows that there is a relationship between the determination of slow crack growth in a creep test on test rods having a circumferential notch and the brittle branch of the internal pressure test in accordance with ISO 1167. A shortening of the time to failure is achieved by shortening the crack initiation time by means of the notch (1.6 mm/razor blade) in ethylene glycol as medium inducing environmental stress cracking at a temperature of 80° C. and a tensile stress of 3.5 MPa. The production of the specimens is carried out by sawing three test specimens having dimensions of 10×10×90 mm from a 10 mm thick pressed plate. The test specimens are in turn notched in the middle by means of a razor blade in a notching apparatus made in-house for this purpose (cf. FIG. 5 in the publication). The notch depth is 1.6 mm.

EXAMPLE 1

The polymerization of ethylene was carried out in a continuous process in three reactors connected in series. A Ziegler catalyst which had been prepared by the method of WO 91/18934, example 2, and has the operations number 2.2 in the WO in an amount of 0.08 mmol/h and also sufficient suspension medium (hexane), triethylaluminum as cocatalyst in an amount of 0.08 mmol/h, ethylene and hydrogen were fed into the first reactor. The amount of ethylene (=65 kg/h) and the amount of hydrogen (=68 g/h) were set so that a proportion of from 25 to 26% by volume ethylene and a proportion of 65% by volume of hydrogen were measured in the gas space of the first reactor; the remainder was a mixture of nitrogen and vaporized suspension medium.

The polymerization in the first reactor was carried out at a temperature of 84° C.

The suspension from the first reactor was then passed to a second reactor in which the proportion of hydrogen in the gas space had been reduced to 7-9% by volume and into which an amount of 48.1 kg/h of ethylene plus an amount of 2940 g/h of 1-butene were introduced. The reduction in the amount of hydrogen was achieved by means of H$_2$ intermediate depressurization. 73% by volume of ethylene, 8% by volume of hydrogen and 0.82% by volume of 1-butene were measured in the gas space of the second reactor; the remainder was a mixture of nitrogen and vaporized suspension medium. Additionally suspension medium and triethylaluminum were introduced.

The polymerization in the second reactor was carried out at a temperature of 83° C.

The suspension from the second reactor was passed via a further H$_2$ intermediate depressurization, by means of which the amount of hydrogen in the gas space in the third reactor was set to 2.5% by volume, into the third reactor.

An amount of 16.9 kg/h of ethylene plus an amount of 1500 g/h of 1-butene were introduced into the third reactor. A proportion of ethylene of 87% by volume, a proportion of hydrogen of 2.5% by volume and a proportion of 1-butene of 1.2% by volume were measured in the gas space of the third reactor; the remainder was a mixture of nitrogen and vaporized suspension medium. In addition, suspension medium and triethylaluminum were introduced.

The polymerization in the third reactor was carried out at a temperature of 83° C.

The long-term activity of the polymerization catalyst necessary for the above-described cascaded mode of operation was ensured by a specially developed Ziegler catalyst having the composition reported in the WO document mentioned at the outset. A measure of the usability of this catalyst is its extremely high response to hydrogen and its high activity which remains constant over a long period of from 1 to 8 hours.

The suspension medium is separated off from the polymer suspension leaving the third reactor, the powder is dried and the powder is passed to pelletization.

The viscosity numbers and the proportions $W_A$, $W_B$ and $W_C$ of polymers A, B and C for the polyethylene molding composition prepared as described in example 1 are shown in table 1 below.

| Example | 1 |
| --- | --- |
| $W_A$ [% by weight] | 50 |
| $W_B$ [% by weight] | 37 |
| $W_C$ [% by weight] | 13 |
| VN$_1$ [cm$^3$/g] | 80 |
| VN$_2$ [cm$^3$/g] | 165 |
| VN$_{overall}$ [cm$^3$/g] | 304 |
| FNCT [h] | 220 |
| AFM (−30° C.) | 3.8 kJ/m$^2$ |
| ACN (+23° C.) | 13 kJ/m$^2$ |

The abbreviations for the physical properties in table 1 have the following meaning:

FNCT=environmental stress cracking resistance (Full Notch Creep Test) measured by the internal measurement method described by M. Fleißner in [h], conditions: 95° C., 3.5 MPa, water/2% of Arkopal.

AFM (−30° C.)=notched impact toughness, measured in accordance with ISO 179-1/1eA/DIN 53453 in [kJ/m$^2$] at −30° C.

ACN (+23° C.)=notched impact toughness, measured in accordance with ISO 179-1/1eA/DIN 53453 in [kJ/m$^2$] at +23° C.

The invention claimed is:

1. A polyethylene molding composition comprising a multimodal molar mass distribution; a density at a temperature of 23° C. in the range from 0.94 to 0.95 g/cm$^3$; an MFI$_{190/5}$ in the range from 1.2 to 2.1 dg/min; from 45 to 55% by weight of a low molecular weight ethylene homopolymer A having a viscosity number VN$_1$ of from 70 to 90 cm$^3$/g; from 30 to 40% by weight of a high molecular weight copolymer B of ethylene and another olefin having from 4 to 8 carbon atoms; and from 10 to 20% by weight of an ultra high molecular weight ethylene copolymer C, where all percentages are based on the total weight of the molding composition wherein a mixture of polymer A plus polymer B has a viscosity number VN$_2$ of 150 to 180 cm$^3$/g, and a mixture of polymer A, polymer B plus polymer C has a viscosity number $VN_3$ of 260 to 340 cm$^3$/g.

2. The polyethylene molding composition according to claim 1, wherein the high molecular weight copolymer B contains from 5 to 8% by weight, based on the weight of copolymer B, of comonomers having from 4 to 8 carbon atoms and the ultra high molecular weight ethylene copolymer C contains from 7 to 11% by weight, based on the weight of copolymer C, of comonomers.

3. The polyethylene molding composition according to claim 1 wherein the comonomers are selected from 1-butene, 1-pentene, 1-hexene, 1-octene, 4-methyl-1-pentene or mixtures thereof.

4. The polyethylene molding composition according to claim 1, further comprising a notched impact toughness AFM (−30° C.) in the range from 3.5 to 4.5 kJ/m$^2$; a notched impact toughness ACN (+23° C.) in the range from 12 to 16 kJ/m$^2$; and an environmental stress cracking resistance (FNCT) in the range from 150 to 250 h.

5. A process for preparing a polyethylene molding composition comprising:
a multimodal molar mass distribution;
a density at a temperature of 23° C. in the range from 0.94 to 0.95 g/cm$^3$;
an $MFI_{190/5}$ in the range from 1.2 to 2.1 dg/min;
from 45 to 55% by weight of a low molecular weight ethylene homopolymer A;
from 30 to 40% by weight of a high molecular weight copolymer B of ethylene and another olefin having from 4 to 8 carbon atoms; and
from 10 to 20% by weight of an ultra high molecular weight ethylene copolymer C, where all percentages are based on the total weight of the molding composition, the process comprising polymerizing in a three stage polymerization, monomer in suspension at temperatures in the range from 20 to 120° C., a pressure in the range from 2 to 10 bar and in the presence of a Ziegler catalyst composed of a transition metal compound and an organoaluminum compound, wherein a molar mass of the polyethylene formed in each stage is regulated in each case by means of hydrogen,
wherein in a first polymerization stage a first hydrogen concentration is set so that a viscosity number $VN_1$ of the low molecular weight polyethylene A is in the range from 70 to 90 cm$^3$/g, in a second polymerization stage, a second hydrogen concentration is set so that a viscosity number $VN_2$ of a mixture of polymer A plus polymer B is in the range from 150 to 180 cm$^3$/g, and in a third polymerization stage a third hydrogen concentration is set so that a viscosity number $VN_3$ of a mixture of polymer A, polymer B plus polymer C is in the range from 260 to 340 cm$^3$/g.

6. A process for producing protective coatings on steel pipes comprising plasticizing the polyethylene molding composition of claim 1 in an extruder at temperatures in the range from 200 to 250° C., thereby forming a plasticized material; extruding the plasticized material through a nozzle onto the surface of the pipe, thereby forming an extruded plasticized material; and cooling the extruded plasticized material.

7. The polyethylene molding composition according to claim 1 wherein the viscosity number $VN_3$ is in the range from 280 to 320 cm$^3$/g.

8. The process according to claim 5 wherein the viscosity number $VN_3$ is in the range 280 to 320 cm$^3$/g.

* * * * *